Patented May 29, 1934

1,960,633

UNITED STATES PATENT OFFICE 1,960,633

MANUFACTURE OF ALCOHOL AND ETHER

Walter Philip Joshua, London, and Herbert Muggleton Stanley, Birmingham, England, assignors to The Distillers Company Limited, Edinburgh, Scotland, a British company No Drawing. Application August 8, 1931, Serial No. 556,036. In Great Britain August 9, 1930

9 Claims. (Cl. 260—156)

This invention relates to the manufacture of alcohol and ether and has for its chief object to enable alcohol or ether or mixtures thereof to be manufactured from ethylene on a commercially practicable scale.

The absorption of ethylene by highly concentrated sulphuric acid (e. g. acid of 95% strength or over) with formation of ethyl esters of sulphuric acid is not new and it is known that alcohol can be obtained by diluting the esters and distilling but the reconcentration of the acid to the degree hitherto considered necessary renders the process impracticable commercially from the economic standpoint.

Whereas hitherto a very high concentration of acid has been regarded as essential and investigation has been made only in the direction of varying temperatures or pressures we have found that good yields of alcohol or ether or both can be obtained using considerably weaker acid by observing suitable temperatures and pressures. The ratio of ether to alcohol produced is mainly dependent on the temperature employed, the ratio increasing with increase of temperature.

The present invention therefore resides essentially in the conversion of ethylene into alcohol or ether or a mixture thereof by treating it at suitable temperature and pressure with acid of appreciably lower concentration than hitherto, such for example as acid of 70% strength.

Ethylene or gas mixtures rich in ethylene can be used; for example the process can be applied to the treatment of ethylene fractions obtained from the gases resulting from the cracking of hydrocarbon oils.

The conversion product may be isolated by distillation in the ordinary way but it will be appreciated that reconcentration of the acid back to 70% strength is an entirely commercial proposition whereas concentration to 95% or over is a costly operation.

While not limiting ourselves to any particular temperatures or pressures, our present view is that the temperature should not exceed 200° C. and that pressures up to about 250 atmospheres are sufficient. The acid need not exceed 90% strength, and in practice good results have been obtained by acid of 60% to 70% strength and pressures of 50 atmospheres and temperatures of from 100° C. to 150° C.

The following are examples of the carrying out of the invention:—

*Example I.*—Using 70% acid and ethylene at a pressure of 50 atmospheres and a temperature of 100° C., we obtained from 100 grams of the 70% acid 11 grams of conversion product consisting of 10 parts alcohol and 1 part ether after a four-hour period of absorption.

*Example II.*—Using 60% acid and ethylene at a pressure of 50 atmospheres and a temperature of 150° C., we obtained from 100 grams of the 60% acid 25 grams of conversion product consisting of 13 parts alcohol and 12 parts ether after a four-hour period of absorption.

*Example III.*—Using 75% acid and ethylene at a pressure of 47 atmospheres and a temperature of 90° C., we obtained from 100 grams of the 75% acid 11.9 grams of conversion product consisting almost entirely of ethyl alcohol after a four-hour period of absorption.

*Example IV.*—Using 75% acid and ethylene at a pressure of 86 atmospheres and a temperature of 90° C., we obtained from 100 grams of the 75% acid 14.9 grams of conversion product consisting almost entirely of ethyl alcohol after a four-hour period of absorption.

*Example V.*—Using 75% acid and ethylene at a pressure of 140 atmospheres and a temperature of 91° C., we obtained from 100 grams of the 75% acid 16.6 grams of conversion product consisting almost entirely of ethyl alcohol after a four-hour period of absorption.

The above examples confirm the statement hereinbefore made to the effect that increase of temperature increases the ratio of ether to alcohol produced. They also indicate that increase of pressure increases the yield of ethyl alcohol but that beyond about 100 atmospheres the amount of the increased yield is not proportionate to the increase in pressure used.

The process may if desired be carried out in the presence of catalysts.

What we claim is:—

1. The method of manufacturing oxygenated aliphatic products from ethylene comprising in absorbing ethylene in aqueous sulphuric acid ranging in strength from 60% to 75% and at a temperature between 90° C. and 150° C. and at a pressure of between forty-seven atmospheres and two hundred and fifty atmospheres and then isolating the product.

2. The method of manufacturing ethyl alcohol from ethylene comprising absorbing ethylene in aqueous sulphuric acid ranging in strength from 60% to 75% and at a temperature between 90° C. and 150° C. and at a pressure of between forty-seven and two hundred and fifty atmospheres and then isolating the product.

3. The method of manufacturing oxygenated aliphatic products from ethylene comprising absorbing ethylene in aqueous sulphuric acid ranging in strength from 60% to 75% and at a temperature between 90° C. and 150° C. and at a pressure between forty-seven and two hundred and fifty atmospheres, diluting with water, distilling off said products, reconcentrating the diluted acid and then re-using the same.

4. The method of manufacturing oxygenated aliphatic products from ethylene comprising absorbing ethylene in aqueous sulphuric acid of between 60% to 70% strength and at a temperature between 90° C. and 150° C. and at a pressure between forty-seven and two hundred and fifty atmospheres and then isolating the product.

5. The method of manufacturing ethyl alcohol from ethylene comprising absorbing ethylene in aqueous sulphuric acid of between 60% and 70% strength and at a temperature between 90° C. and 150° C. and at a pressure between forty-seven and two hundred and fifty atmospheres and then isolating said alcohol.

6. The method of manufacturing alcohol and ether from ethylene comprising absorbing the ethylene in aqueous sulphuric acid of between 60% and 75% strength and at a temperature of between 90° C. and 150° C. and at a pressure between forty-seven and two hundred and fifty atmospheres, determining the ratio of alcohol production to ether production by regulation of the temperature within the above-mentioned limits and then isolating the alcohol and ether produced.

7. The method of manufacturing alcohol from gases containing ethylene comprising absorbing the ethylene in aqueous sulphuric acid of 60% to 75% strength and at a temperature between 90° C. and 150° C. and at a pressure between forty-seven and two hundred and fifty atmospheres and then isolating the resultant alcohol.

8. The method of manufacturing alcohol comprising passing ethylene into sulphuric acid of 60% to 75% strength and at a temperature between 90° C. and 150° C. and at a pressure between forty-seven and one hundred and forty atmospheres, diluting the resultant liquid, distilling off the resultant alcohol and reconcentrating the acid to its original strength for re-use.

9. The method of manufacturing alcohol by passing gases containing ethylene into sulphuric acid of between 60% and 70% strength and at a temperature between 90° C. and 150° C. and at a pressure between forty-seven and one hundred and forty atmospheres, isolating the resultant alcohol from the acid liquid and reconcentrating the acid back to but not beyond its original strength for re-use.

WALTER PHILIP JOSHUA.
HERBERT MUGGLETON STANLEY.